(12) United States Patent
Kang et al.

(10) Patent No.: US 7,346,361 B2
(45) Date of Patent: *Mar. 18, 2008

(54) SYSTEM AND METHOD FOR CONTROLLING AN OPERATIONAL MODE OF A MAC LAYER IN BROADBAND WIRELESS ACCESS COMMUNICATION SYSTEM

(75) Inventors: Hyon-Goo Kang, Suwon-si (KR);
Bong-Gee Song, Seongnam-si (KR);
Kwang-Seop Eom, Seongnam-si (KR);
Seung-Eun Hong, Suwon-si (KR);
Yeong-Moon Son, Anyang-si (KR);
So-Hyun Kim, Suwon-si (KR);
Seung-Il Yoon, Seongnam-si (KR);
Tae-Won Kim, Yongin-si (KR);
Gaun-Hwi Lim, Seongnam-si (KR);
Jung-Shin Park, Seoul (KR);
Jae-Jeong Shim, Seoul (KR);
Hong-Sung Chang, Suwon-si (KR);
Yong Chang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/409,864

(22) Filed: Apr. 24, 2006

(65) Prior Publication Data

US 2006/0189318 A1 Aug. 24, 2006

Related U.S. Application Data

(63) Continuation of application No. 11/072,990, filed on Mar. 4, 2005, now Pat. No. 7,039,430.

(30) Foreign Application Priority Data

Mar. 4, 2004 (KR) ................. 2004-14753

(51) Int. Cl.
*H04Q 7/20* (2006.01)
(52) U.S. Cl. .................... 455/458; 455/440; 455/436; 455/560; 455/517; 455/422.1; 370/338
(58) Field of Classification Search ........ 455/436–444, 455/456.1, 456.2, 502, 517, 574, 560, 424, 455/428, 458, 440, 422.1, 434; 370/330–332, 370/311, 348–349, 318, 338, 389
See application file for complete search history.

(56) References Cited

U.S. PATENT DOCUMENTS 5,511,067 A * 4/1996 Miller ....................... 370/335

(Continued)

*Primary Examiner*—George Eng
*Assistant Examiner*—Kamran Afshar
(74) *Attorney, Agent, or Firm*—The Farrell Law Firm, PC

(57) ABSTRACT

A method for controlling operation modes of a medium access control layer by a mobile subscriber station in a broadband wireless access communication system including the mobile subscriber station and a serving base station providing service to the mobile subscriber station is provided. The method includes the steps of: mode-transiting into an idle mode when there is no data transmission between the serving base station and the mobile subscriber station during a predetermined first time interval in an awake mode; detecting movement of the mobile subscriber station in the idle mode into another paging zone covering a target base station, which is different from a paging zone covering the serving base station; and mode-transiting into the awake mode and performing location update together with the target base station when the movement of the mobile subscriber station is detected.

7 Claims, 10 Drawing Sheets

U.S. PATENT DOCUMENTS

| | | | |
|---|---|---|---|
| 5,627,882 A * | 5/1997 | Chien et al. | 455/464 |
| 5,752,202 A * | 5/1998 | Obright | 455/574 |
| 5,953,648 A * | 9/1999 | Hutchison et al. | 455/343.4 |
| 5,991,635 A * | 11/1999 | Dent et al. | 455/517 |
| 6,088,587 A * | 7/2000 | Abbadessa | 455/424 |
| 6,192,247 B1 * | 2/2001 | Dillon et al. | 455/446 |
| 6,285,662 B1 * | 9/2001 | Watanabe et al. | 370/280 |
| 6,438,375 B1 * | 8/2002 | Muller | 455/435.3 |
| 6,584,314 B1 * | 6/2003 | Haumont et al. | 455/435.1 |
| 6,590,886 B1 * | 7/2003 | Easton et al. | 370/342 |
| 6,639,907 B2 * | 10/2003 | Neufeld et al. | 370/342 |
| 6,735,454 B1 * | 5/2004 | Yu et al. | 455/574 |
| 6,832,094 B2 * | 12/2004 | Butler et al. | 455/458 |
| 6,889,055 B1 * | 5/2005 | Neufeld | 455/458 |
| 6,922,561 B2 * | 7/2005 | Chen et al. | 455/435.1 |
| 7,039,430 B2 * | 5/2006 | Kang et al. | 455/458 |
| 7,142,520 B1 * | 11/2006 | Haverinen et al. | 370/311 |
| 7,151,945 B2 * | 12/2006 | Myles et al. | 455/502 |
| 2002/0054620 A1 * | 5/2002 | Maruyama | 375/147 |
| 2002/0187804 A1 * | 12/2002 | Narasimha et al. | 455/552 |
| 2003/0145092 A1 * | 7/2003 | Funato et al. | 709/229 |
| 2004/0102200 A1 * | 5/2004 | Palkisto et al. | 455/466 |
| 2004/0127163 A1 * | 7/2004 | Schramm et al. | 455/67.11 |
| 2004/0176147 A1 * | 9/2004 | Escalante | 455/574 |
| 2004/0198383 A1 * | 10/2004 | Choi | 455/456.1 |
| 2004/0203838 A1 * | 10/2004 | Joshi et al. | 455/455 |
| 2004/0235536 A1 * | 11/2004 | Kim et al. | 455/574 |
| 2005/0049013 A1 * | 3/2005 | Chang et al. | 455/574 |
| 2005/0059347 A1 * | 3/2005 | Haartsen | 455/41.2 |
| 2005/0070340 A1 * | 3/2005 | Kim | 455/574 |
| 2005/0075148 A1 * | 4/2005 | Park | 455/574 |
| 2005/0122936 A1 * | 6/2005 | Son et al. | 370/331 |
| 2005/0128990 A1 * | 6/2005 | Eom et al. | 370/338 |
| 2005/0197171 A1 * | 9/2005 | Son et al. | 455/574 |
| 2006/0194581 A1 * | 8/2006 | Kang et al. | 455/436 |

* cited by examiner

SYSTEM AND METHOD FOR CONTROLLING AN OPERATIONAL MODE OF A MAC LAYER IN BROADBAND WIRELESS ACCESS COMMUNICATION SYSTEM

PRIORITY

This application is a continuation Application of Ser. No. 11/072,990, filed Mar. 4, 2005, now U.S. Pat. No. 7,039,430, and claims priority an application entitled "System and Method for Controlling Operational Mode of MAC Layer in Broadband Wireless Access Communication System" filed in the Korean Industrial Property Office on Mar. 4, 2004 and assigned Ser. No. 2004-14753, the contents of which are incorporated herein by reference.

BACKGROUND OF THE INVENTION

1. Field of the Invention

The present invention relates to a broadband wireless access communication system, and more particularly to a system and method for controlling the operation mode of a Medium Access Control (MAC) layer.

2. Description of the Related Art

In $4^{th}$ generation (4G) communication systems, which are the next generation communication systems, improvements focus on providing various qualities of service (QoSs) at high transmission speed. The third generation (3G) communication system supports a transmission speed of about 384 kbps outdoors with relatively bad channel conditions and a maximum transmission speed of about 2 Mbps indoors with relatively good channel conditions Wireless Local Area Network (LAN) and Metropolitan Area Network (MAN) communication systems generally support transmission speeds of 20 to 50 Mbps. Since the wireless MAN communication system has a wide service coverage and supports a high transmission speed, it is suitable for supporting a high speed communication service. However, the wireless MAN system does not provide for mobility of a user, i.e., a subscriber station (SS), or a handover for high speed movement of the SS.

As a result, in 4G communication systems, a new type of communication system ensuring mobility and QoS for wireless LAN and MAN systems supporting relatively high transmission speeds is being developed to support high speed service in the 4G communication system.

The IEEE (Institute of Electrical and Electronics Engineers) 802.16a communication system employs an Orthogonal Frequency Division Multiplexing (OFDM) scheme and an Orthogonal Frequency Division Multiple Access (OFDMA) scheme to support a broadband transmission network for a physical channel of the wireless MAN system.

The IEEE 802.16a communication system considers only a single cell structure and stationary SSs, so the system does not consider movement of the SSs. In contrast, an IEEE 802.16e communication system has been defined as a system designed for mobility of an SS in addition to the IEEE 802.16a communication system, and thus, should reflect mobility of an SS in a multi-cell environment. To provide for the mobility of an SS in a multi-cell environment as described above, of the operation mode changes of the SS and its base station (BS) are considered and accommodated. To that end, research about SS handover in a multi-cell structure is actively pursued to support SS mobility. Herein, a mobile SS is referred to as an Mobile Subscriber Station (MSS).

FIG. 1 is a block diagram schematically illustrating the structure of a IEEE 802.16e communication system.

Referring to FIG. 1, the IEEE 802.16e communication system has a multi-cell structure with a cell 100 and a cell 150. In addition, the IEEE 802.16e communication system includes a BS 110 controlling the cell 100, a BS 140 controlling the cell 150, and a plurality of MSSs 111, 113, 130, 151, and 153. The transmission/reception of signals between the BSs 110 and 140 and the MSSs 111, 113, 130, 151, and 153 is accomplished through an OFDM/OFDMA scheme. The MSS 130 is located in a boundary zone (i.e., handover zone) between the cell 100 and the cell 150. When a handover for the MSS 130 is possible, the MSS 130 can move without loss of service.

In the IEEE 802.16e communication system, a certain MSS receives pilot signals transmitted from a plurality of BSs and measures Carrier to Interference and Noise Ratios (CINRs) of the received pilot signals. The MSS selects the BS with the highest CINR as a serving BS, which means the MSS belongs to that BS. The MSS, having selected the serving BS, receives the downlink frame and uplink frame transmitted from the serving BS and uses them in transmitting and receiving data.

In the case where mobility of the MSS is taken into consideration as described above, MSS power consumption plays an important part in system performance. Therefore, a sleep mode operation and an awake mode operation have been proposed for the BS and the MSS to minimize MSS power consumption.

Hereinafter, operation modes of a Medium Access Control (MAC) layer for the IEEE 802.16e communication system will be described with reference to FIG. 2.

FIG. 2 is a mode diagram schematically illustrating the operation modes supported by a MAC layer of the IEEE 802.16e communication system.

Referring to FIG. 2, the MAC layer of the IEEE 802.16e communication system supports two kinds of operation modes (i.e., an awake mode 210 and a sleep mode 220). First, the sleep mode 220 has been proposed in order to minimize the power consumption of the MSS during idle time when packet data is not transmitted. The MSS mode-transits (211) from the awake mode 210 to the sleep mode 220, thereby minimizing the power consumption of the MSS during the idle time when packet data is not transmitted. In general, packet data is transmitted in bursts when generated. It would be inefficient to perform the same operations when data is transmitted and when data is not transmitted. For this reason, the sleep mode operation as described above has been developed.

When packet data is generated while the MSS is in the sleep mode, the MSS mode-transits into the awake mode and transmits/receives the packet data. However, because the packet data is highly reliable on a traffic mode, the sleep mode operation must be organically performed in consideration of the traffic characteristic and the transmission scheme characteristic of the packet data.

Hereinafter, schemes proposed up to now for the IEEE 802.16e communication system to support operation in the sleep mode 220 will be described.

First, to mode-transit into the sleep mode 220, an MSS receives mode transition consent from a BS. The BS allows the MSS to shift into the sleep mode 220 simultaneously while buffering or dropping the packet data to be transmitted to the MSS. In addition, the BS informs the MSS of packet data to be transmitted during the listening interval of the MSS. T he MSS awakes from the sleep mode 220 and checks whether there is any packet data to be transmitted from the BS to the MSS. The listening interval will be described below in more detail. When there is packet data to be transmitted from the BS to the MSS, the MSS mode-transits to the awake mode 210 from the sleep mode 220 and receives the packet data from the BS. When there is no packet data to be transmitted from the BS to the MSS, the MSS stays in the sleep mode 220.

Hereinafter, parameters to support operation in the sleep mode and the awake mode will be described.

1) Sleep Interval

The sleep interval is an interval requested by an MSS and assigned by a BS according to the MSS request. The sleep interval also represents the time it takes to go from the sleep mode 220 to the awake mode 210. In other words, the sleep interval is defined as an interval during which the MSS stays in the sleep mode 220. The MSS may continue to stay in the sleep mode 220 even after the sleep interval is over. In this case, the MSS updates the sleep interval by performing a sleep interval update algorithm by means of a preset initial sleep window value and a final sleep window value. Herein, the initial sleep window value corresponds to a minimum sleep window value and the final sleep window value corresponds to a maximum sleep window value. Further, both the initial sleep window value and the final sleep window value are assigned by the BS and expressed by the number of frames. Since the minimum window value and the maximum window value will be described in detail below, a further description is omitted here.

2) Listening Interval

The listening interval is an interval requested by an MSS and assigned by a BS according to the MSS request. Further, the listening interval represents the time it takes for the MSS to awake from the sleep mode 220 and synchronize with the downlink signal of the BS sufficient enough to decode downlink messages such as a traffic indication (TRF_IND) message. Herein, the TRF_IND message is a message representing existence of traffic (i.e., packet data) to be transmitted to the MSS. Since the TRF_IND message will be described below, a further detailed description is omitted here. The MSS determines whether to stay in the awake mode or to mode-transit back into the sleep mode according to the values of the TRF_IND message.

3) Sleep Interval Update Algorithm

When the MSS goes into the sleep mode 220, it determines the sleep interval while regarding the preset minimum window value as a minimum sleep mode interval. After the sleep interval passes, the MSS awakes from the sleep mode 220 for the listening interval and checks whether there is packet data to be transmitted from the BS. If there is no packet data to be transmitted, the MSS renews the sleep interval to be twice as long as that of the previous sleep interval and continues to stay in the sleep mode 220. For example, when the minimum window value is "2", the MSS sets the sleep interval to be 2 frames and stays in the sleep mode for 2 frames. After passage of the 2 frames, the MSS awakes from the sleep mode and determines whether the TRF_IND message has been received. When the TRF_IND message has not been received (that is, when no packet data transmitted from the BS to the MSS exists), the MSS sets the sleep interval to be 4 frames (twice as many as 2 frames) and stays in the sleep mode 220 during the 4 frames. In this way, the sleep interval increases within a range from the initial sleep window value to the final sleep window value. The algorithm for updating the sleep interval as described above is the sleep interval update algorithm.

Hereinafter, a network re-entry process of an MSS will be described with reference to FIG. 3.

FIG. 3 is a signal flowchart schematically illustrating a network re-entry process of an MSS in a conventional IEEE 802.16e communication system.

First, in step 311, according to handover, the MSS receives preambles of downlink frames transmitted from the handovered BS (i.e. a new serving BS) and acquires system sync with the new serving BS. Thereafter, the MSS acquires downlink sync from BS information contained in messages broadcasted by the BS, which include a Downlink Channel Descriptor (DCD) message, an Uplink Channel Descriptor (UCD) message, a downlink map (DL_MAP) message, an uplink map (UL_MAP) message, a mobile neighbor advertisement (MOB_NBR_ADV) message.

Thereafter, in step 313, the MSS transmits a ranging request (RNG_REQ) message to the BS, receives a ranging response. (RNG_RSP) message from the BS in response to the RNG_REQ message, and acquires uplink sync with the BS from the RNG_RSP message. Then, in step 315, the MSS adjusts frequency and power.

Thereafter, in step 317, the MSS negotiates the basic capacity of the MSS with the BS. In step 319, the MSS acquires an Authorization Key(AK) and a Traffic Encryption Key (TEK) by performing authentication operation together with the BS. In step 321, the MSS requests the BS to register the MSS and the BS completes registration of the MSS. In step 323, the MSS performs an Internet Protocol (IP) connection with the BS. In step 325, the MSS downloads operational information through the IP in connection with the BS. In step 327, the MSS performs service flow connection with the BS. Here, the service flow refers to a flow in which MAC_SDUs (service data units) are transmitted and received through a connection having a certain, predetermined threshold QoS. Thereafter, in step 329, the MSS uses the service provided from the BS. Then, the process ends.

Next, a handover process in an IEEE 802.16e communication system will be described with reference to FIG. 4.

FIG. 4 is a signal flow diagram schematically illustrating a handover process in a conventional IEEE 802.16e communication system.

Referring to FIG. 4, the MSS scans CINRs of the pilot signals from the neighbor BSs in the process described (step 411). When the MSS 400 determines that it should change the serving BS (step 413), the MSS 400 transmits an Mobile Handover Request (MOB_HO_REQ) message to the current serving BS 410 (step 415). FIG. 4 is based on an assumption that the MSS 400 has two neighbor BSs including a first BS 420 and a second BS 430. Here, the MOB_HO_REQ message includes the result of scanning by the MSS 400.

When the serving BS 410 receives the MOB_HO_REQ message, the serving BS 410 detects information on a list of neighbor BSs to which the MSS 400 can be handed over from information contained in the received MOB_HO_REQ message (step 417). Here, for the convenience of description, the list of neighbor BSs to which the MSS 400 can be handed over will be referred to as 'handover-available neighbor BS list', and this example assumes that the handover-available neighbor BS list includes the first BS 420 and the second BS 430. The serving BS 410 transmits a handover notification (HO_NOTIFICATION) message to the neighbor BSs contained in the handover-available neighbor BS list, i.e., the first BS 420 and the second BS 430 (steps 419 and 421).

Upon receiving the HO_NOTIFICATION message from the serving BS 410, each of the first BS 420 and the second BS 430 transmits a handover notification response (HO_NOTIFICATION_RESPONSE) message, which is a response message to the HO_NOTIFICATION message, to the serving BS 410 (step 423 and 425). The HO_NOTIFI-CATION_RESPONSE message contains a plurality of Information Elements (IEs) including an MSS ID of the MSS 400, a response (ACK/NACK) regarding whether or not the neighbor BSs can perform the handover in response to the request of the MSS 400, and bandwidth and service level information which each of the neighbor BSs can provide when the MSS 400 is handed over for each BS.

When the serving BS 410 has receives the HO_NOTIFI-CA-TION_RESPONSE message transmitted from the first neighbor BS 420 and the second neighbor BS 430, the serving BS 410 selects a neighbor BS that can optimally provide a bandwidth and a service level requested by the MSS 400 when the MSS 400 is handed over, as a target BS to which the MSS 400 will be actually handed over.

For instance, if the service level required by the MSS 400 is higher than a service level which can be provided by the first neighbor BS 420 and is equal to a service level which can be provided by the second neighbor BS 430, the serving BS 410 will select the second neighbor BS 430 as the target BS. Then, the, serving BS 410 transmits a handover notification confirmation (HO_NOTIFI-CATION_CONFIRM) message to the second neighbor BS 430 as a response to the HO_NOTIFICATION_RESPONSE message (step 427).

The serving BS 410 transmits an Mobile handover response (MOB_HO_RSP) message to the MSS 400 as a response to the MOB_HO_REQ message (step 429). The MOB_HO_RSP message contains information on the target BS to which the MSS 400 will be handed over.

Next, upon receiving the MOB_HO_RSP message, the MSS 400 analyzes the information contained in the MOB_HO_RSP message and selects the target BS. After selecting the target BS, the MSS 400 transmits an Mobile handover indication (MOB_HO_IND) message to the serving BS 410 as a response to the MOB_HO_RSP message (step 431).

Upon receiving the MOB_HO_IND message, the serving BS 410 recognizes that the MSS 400 will be handed over to the target BS (i.e., the second neighbor BS 430) contained in the MOB_HO_IND message, and then releases the present setup link with the MSS 400 (step 433). Then, the MSS 400 performs an initial ranging process with the second neighbor BS 430 (step 435) and performs a network re-entry process with the second neighbor BS 430 when the initial ranging succeeds(step 437).

The handover-related operations as described with reference to FIG. 4 are operations performed by the MSS in awake mode. However, when the MSS detects that it has reached a cell boundary zone while in sleep mode, the MSS switches to the awake mode and performs the handover-related operations of FIG. 4. In other words, when the MSS moves from a first cell to a second cell in sleep mode, the MSS cannot restore the connection with the first cell BS and performs a network re-entry process with the second cell BS. In performing the network re-entry process in the current IEEE 802.16e communication system, the MSS transmits an BS identifier (BS ID) of the previous BS to which the MSS belonged, so that the new BS can recognize that the MSS is being-handed over. Then, the new BS can acquire information of the MSS from the previous BS and perform the handover together with the MSS.

The above description is given on both a method for reducing power consumption of an MSS and a method for handover of an MSS. However, when the method for reducing power consumption is applied to an MSS in the sleep mode, the method becomes inefficient because the MSS, although it is in sleep mode, must perform the handover as described above whenever it shifts between cells, especially when even an MSS having no traffic to transmit or receive at all must perform the handover whenever it shifts between cells. The effect MSS power consumption reduction is lessened and message overhead is generated during the handover operation. Furthermore, all MSSs in the sleep and awake modes perform periodic ranging. This, too, causes unnecessary power consumption and generates message overhead.

Further, the current IEEE 802.16e communication system constantly assigns various types of basic radio resources to MSSs with no traffic to transmit or receive. Below are the basic radio resources that are always assigned regardless of actual need.

(1) Basic Connection Identifier (CID)(Basic CID)

The basic CID is a connection identifier used in transmitting a message that is relatively short and must be urgently transmitted (i.e., an urgent control message).

(2) Primary Management CID

The primary management CID is a connection identifier used in transmitting a message that is relatively long and has a relatively lower urgency.

(3) Secondary Management CID

The secondary management CID is a connection identifier used in transmitting a message that has a relatively lower urgency and relates to a standard protocol for at least three layers.

Furthermore, in the IEEE 802.16e communication system, each MSS is assigned an Internet Protocol version 4 (IPv4) address which is also a limited radio resource. As described above, in the IEEE 802.16e communication system, radio resources as described above, such as the connection identifiers and IPv4 addresses, may be assigned to MSSs having no data to transmit or receive, thereby degrading the efficiency in use of radio resources. Therefore, there is a necessity for a specific operation scheme of a MAC layer to support operation between a BS and an MSS, that can maximize efficiency in use of radio resources while minimizing power consumption of the MSS moving at high speeds.

SUMMARY OF THE INVENTION

Accordingly, the present invention has been made to solve the above-mentioned problems occurring in the prior art, and an object of the present invention is to provide a system and a method for controlling MAC layer operation modes of a broadband wireless access communication system.

It is another object of the present invention to provide a system and a method for minimizing power consumption of MSSs by controlling MAC layer operation modes of a broadband wireless access communication system.

It is another object of the present invention to provide a system and a method for paging an MSS in an idle mode of a MAC layer in a broadband wireless access communication system.

It is another object of the present invention to provide a system and a method for location update according to movement of the MSS in an idle mode of a MAC layer in a broadband wireless access communication system.

To accomplish this object, there is provided a method for controlling operation modes of a medium access control layer by a mobile subscriber station in a broadband wireless access communication system including the mobile subscriber station and a serving base station providing service to the mobile subscriber station. The method comprises the steps of mode-transiting into an idle mode when the mobile subscriber station is in an inactive state to conserve power and operational resources; detecting movement of the mobile subscriber station in the idle mode into another paging zone to which a target base station belongs, which is different from a paging zone to which the serving base station belongs; and mode-transiting into the awake mode and performing location update together with the target base station when the movement of the mobile subscriber station is detected.

In accordance with another aspect of the present invention, there is provided a method for controlling operation modes of a medium access control layer by a mobile subscriber station in a broadband wireless access communication system including the mobile subscriber station and a serving base station providing service to the mobile subscriber station. The method comprises the steps of mode-transiting into an idle mode when there is no data transmission between the serving base station and the mobile subscriber station during a predetermined first time interval in an awake mode; and mode-transiting into the awake mode and performing location update of the mobile subscriber station itself at each predetermined interval in the idle mode.

In accordance with another aspect of the present invention, there is provided a method for determining paging time points for a plurality of mobile subscriber stations by a paging controller when mobile some subscriber stations mode-transits from an awake mode having transmission of traffic into an idle mode having no transmission of traffic from among the plurality of mobile subscriber stations in a broadband wireless access communication system including a base station, the plurality of mobile subscriber stations in a cell controlled by the base station, and the paging controller connected to the base station, the method including determining a paging interval; determining an offset value in order to differently set time points at which mobile subscriber stations awake; and determining based on the paging interval and the offset value the time points at which mobile subscriber stations awake.

In accordance with another aspect of the present invention, there is provided a system for controlling operation modes of a medium access control layer by a mobile subscriber station in a broadband wireless access communication system including the mobile subscriber station and a serving base station providing service to the mobile subscriber station. The system comprises the mobile subscriber station which mode-transits into an idle mode when there is no data transmission between the serving base station and the mobile subscriber station during a predetermined first time interval in an awake mode, mode-transits into the awake mode and transmits a location update request to a target base station when detecting movement of the mobile subscriber station in the idle mode into another paging zone to which the target base station belongs, which is different from a paging zone to which the serving base station belongs, and performs location update in accordance with a location update response from the target base station, which responds to the location update request; the target base station which, together with a paging controller for performing the paging zones, performs the location update of the mobile subscriber station and transmits the location update response to the mobile subscriber station when the location update request from the mobile subscriber station is detected; and the paging controller for updating the location of the mobile subscriber station correspondingly to the location update operation of the target base station and the mobile subscriber station.

In accordance with another aspect of the present invention, there is provided a system for controlling operation modes of a medium access control layer in a broadband wireless access communication system. The system comprises a mobile subscriber station which mode-transits into an idle mode when there is no data transmission between a base station and the mobile subscriber station during a predetermined first time interval in an awake mode, mode-transits into the awake mode and transmits a location update request to the base station at each predetermined interval in the idle mode, and performs location update in accordance with a location update response from the base station, which responds to the location update request; the base station which, together with a paging controller for performing the paging zones, performs the location update of the mobile subscriber station and transmits the location update response to the mobile subscriber station when the location update request from the mobile subscriber station is detected; and the paging controller for updating the location of the mobile subscriber station correspondingly to the location update operation of the base station and the mobile subscriber station.

In accordance with another aspect of the present invention, there is provided a method for determining paging time points for a plurality of mobile subscriber stations by a paging controller when mobile some subscriber stations mode-transits from an awake mode having transmission of traffic into an idle mode having no transmission of traffic from among the plurality of mobile subscriber stations in a broadband wireless access communication system including a base station, the plurality of mobile subscriber stations in a cell controlled by the base station, and the paging controller connected to the base station. The method comprises the steps of determining a paging cycle; determining an offset value in order to differently set time points at which mobile subscriber stations awake; and determining based on the paging cycle and the offset value the time points at which mobile subscriber stations awake.

In accordance with another aspect of the present invention, there is provided a broadband wireless access communication system comprising a base station; a plurality of mobile subscriber stations in a cell controlled by the base station; and a paging controller for determining paging time points for a plurality of mobile subscriber stations when mobile some subscriber stations mode-transits from an awake mode having transmission of traffic into an idle mode having no transmission of traffic from among the plurality of mobile subscriber stations, determining an offset value in order to differently set time points at which mobile subscriber stations awake, and determining based on a paging cycle and the offset value the time points at which mobile subscriber stations awake.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description, a detailed description of known functions and configurations incorporated herein will be omitted when it may make the subject matter of the present invention unclear.

Figure 1:
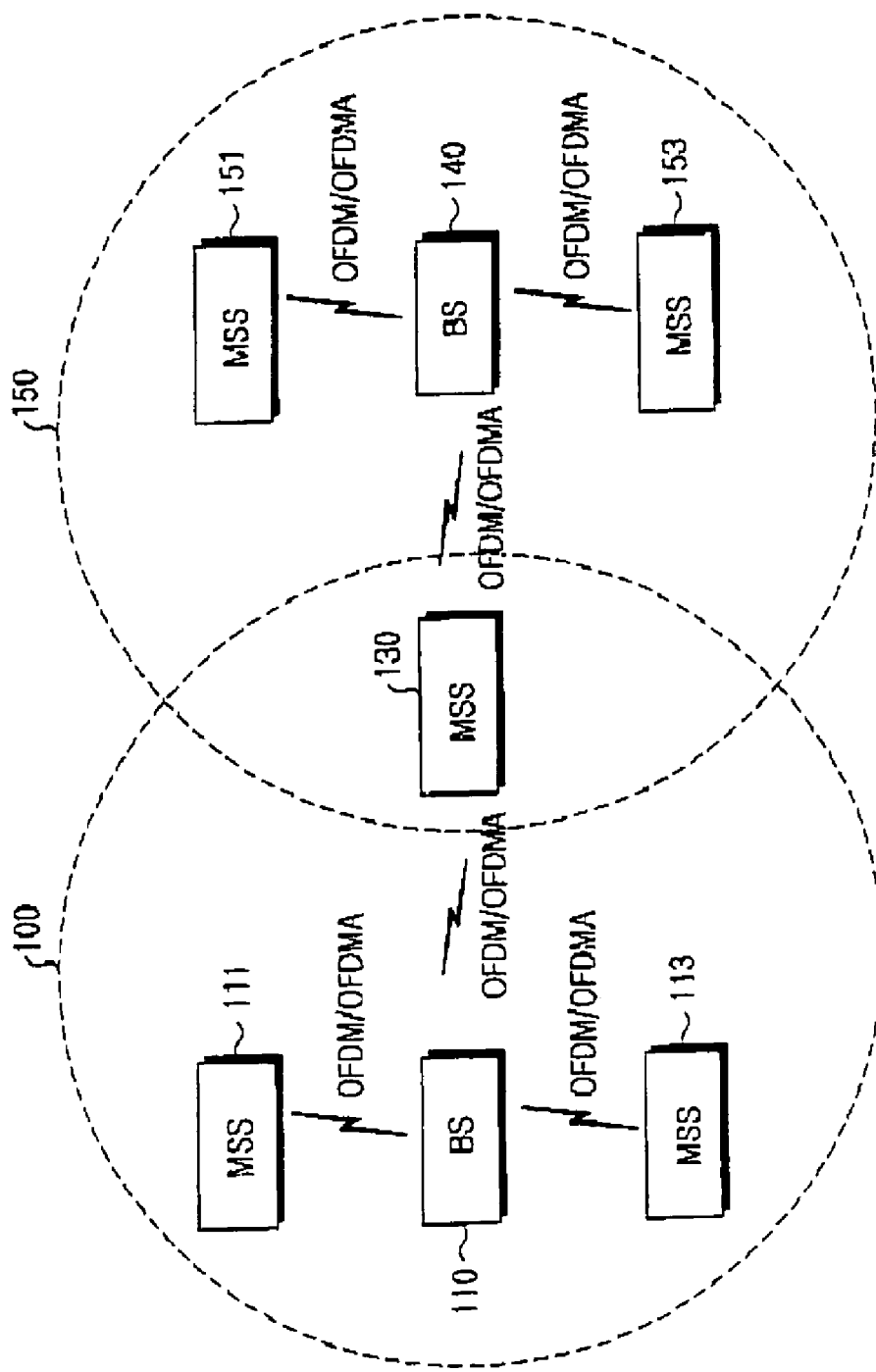
FIG. 1 is a block diagram schematically showing the structure of a typical IEEE 802.16e communication system.
Figure 2:
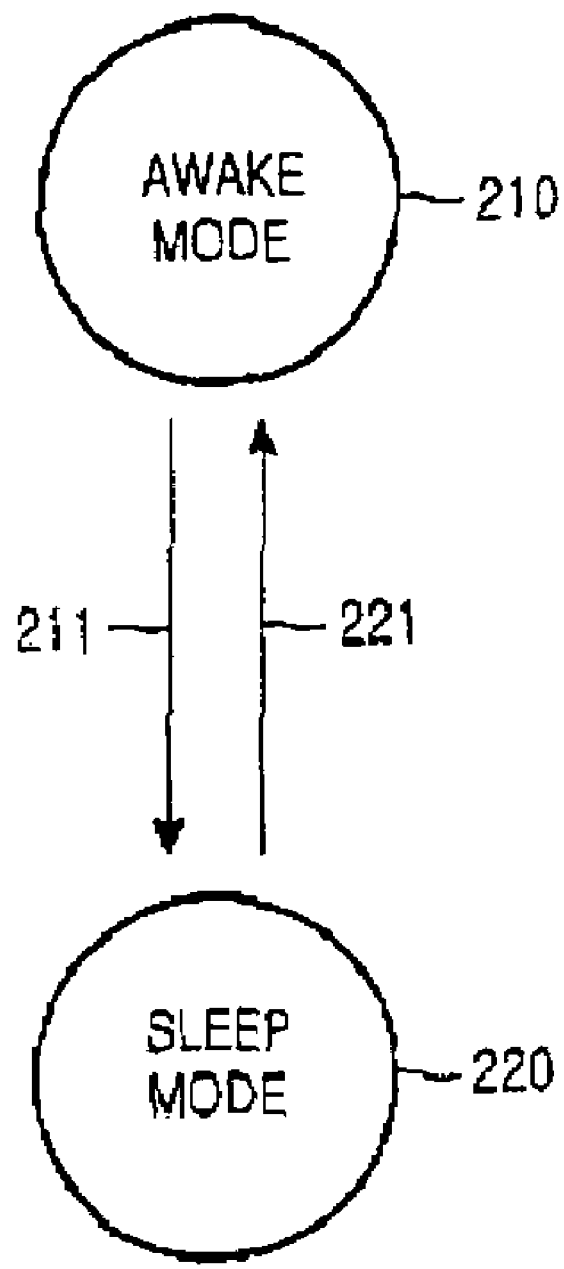
FIG. 2 is a mode diagram schematically illustrating the operation modes supported by a MAC layer of a typical IEEE 802.16e communication system.
Figure 3:
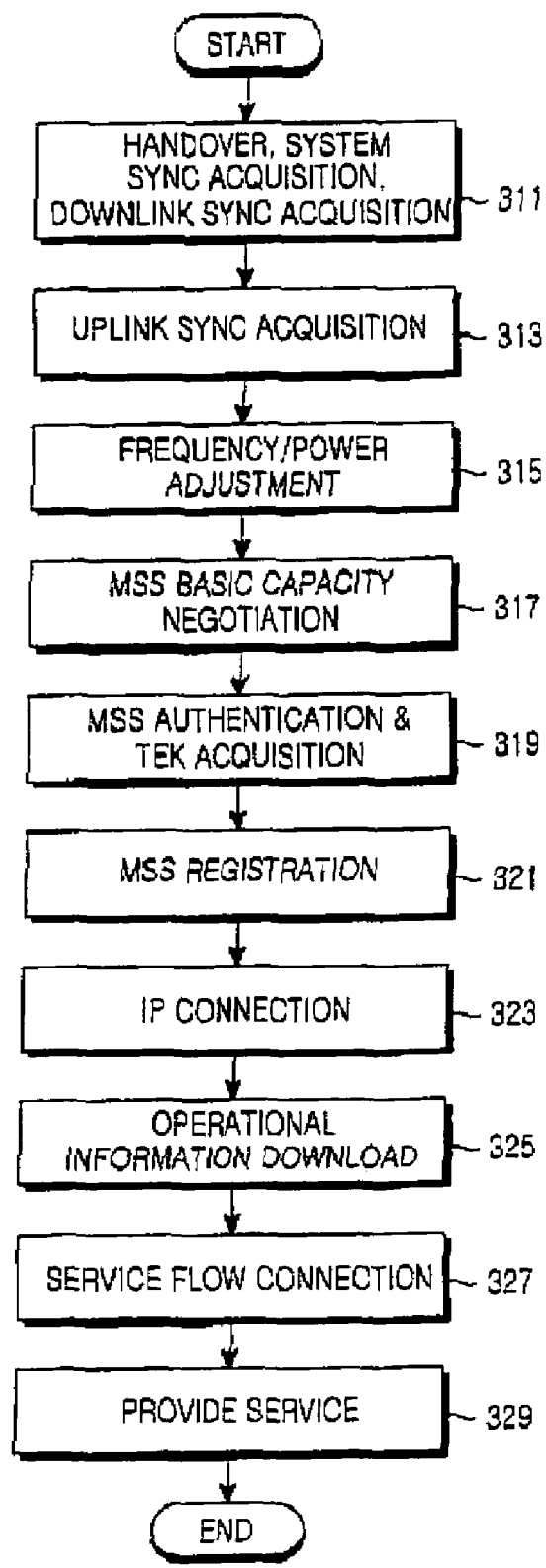
FIG. 3 is a signal flowchart schematically showing a process in which an MSS enters a network of a typical IEEE 802.16e communication system.
Figure 4:
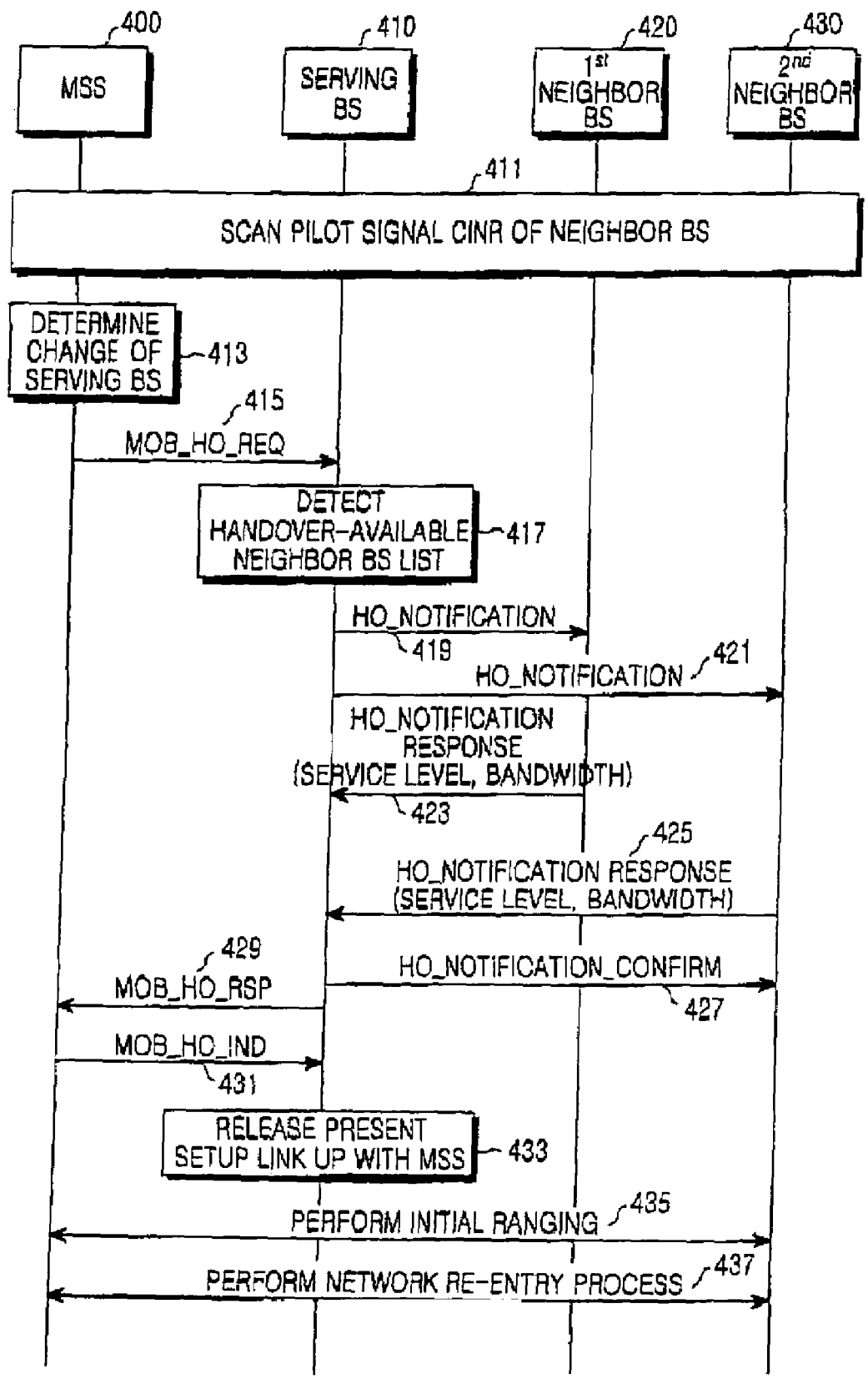
FIG. 4 is a signal flow diagram schematically showing a handover process in a typical IEEE 802.16e communication system.
Figure 5:
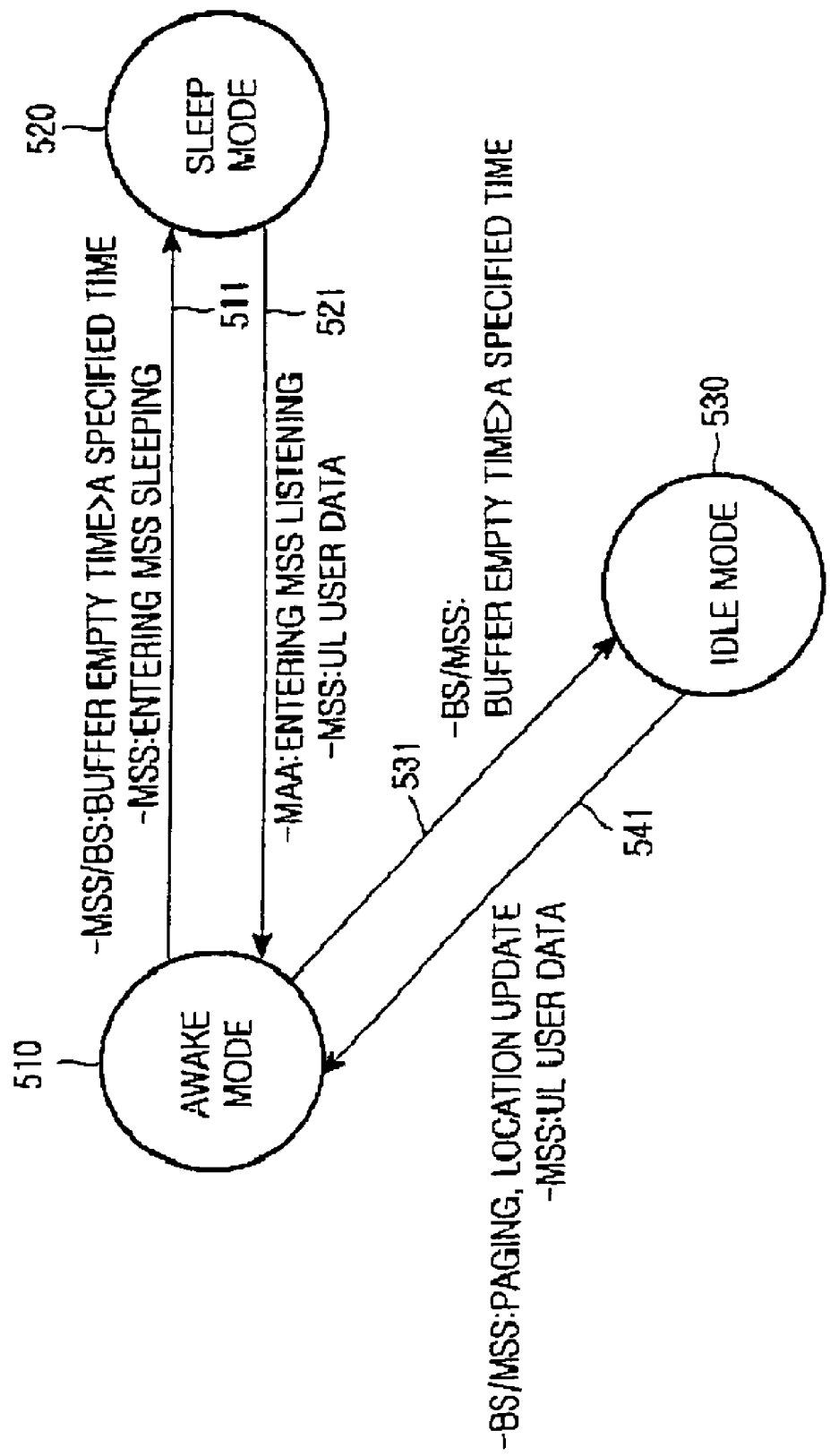
FIG. 5 is a diagram schematically illustrating the operation modes supported by a MAC layer of a broadband wireless access communication system according to an embodiment of the present invention.

FIG. 5 is a diagram schematically illustrating the operation modes supported by a Medium Access Control(MAC) layer of a broadband wireless access(BWA) communication system according to an embodiment of the present invention.

In the following description of embodiments of the present invention, an Institute of Electrical and Electronics Engineers(IEEE) 802.16e communication system performing communication by an Orthogonal Frequency Division Multiplexing(OFDM) scheme and an Orthogonal Frequency Division Multiple Access(OFDMA) scheme is employed as an example of the BWA communication system of the present invention. Referring to FIG. 5, a MAC layer of the IEEE 802.16e communication system supports three kinds of operation modes (i.e., an awake mode 510, a sleep mode 520, and an idle mode 530). The awake mode 510 and the sleep mode 520 are the same as the awake mode 210 and the sleep mode 220, so a detailed description of them is omitted here.

The idle mode 530 is a new mode included in an embodiment of the present invention. An Mobile Subscriber Station (MSS) in the idle mode 530 does not transmit or receive traffic. It measures downlink preambles, specifically intensities of pilot signals, transmitted from neighbor base stations(BSs), and receives only system information and paging messages broadcasted from the neighbor BSs, thereby maximizing the effect of reduction in power consumption. That is, the MSS being in the idle mode 530 exits in an inactive state and thus, the MSS changes the current mode into the idle mode 530 in order to preserve power source and operation resources under the inactive state.

In this case, when a Carrier to Interference and Noise Ratio (CINR) of a pilot signal from a particular neighbor BS (i.e., a target BS) is higher than the current BS, the MSS, while in idle mode 530, determines that the MSS has moved from the serving BS to the target BS.

The MSS analyzes System Information (SI) broadcast from the target BS and compares a Paging Zone Identifier (PZID), with a PZID of the previous BS or the serving BS. When the PZID of the previous BS is different from the PZID of the target BS, the MSS performs location registration. When the PZID of the previous BS is identical to the PZID of the target BS, the MSS remains in sleep for a predetermined time interval once more. After the predetermined time interval passes, the MSS performs location registration, thereby updating the location information, even when there is no change in location.

Hereinafter, the paging zone will be described.

The paging zone is a zone in which a plurality of BSs are grouped to constitute one paging unit. That is, a plurality of BSs are grouped to generate one paging zone as a paging unit, and location information of MSSs is managed for each of the paging zones. Each of the paging zones is identified using a Paging Zone Identifier (PZID). Each BS broadcasts a PZID of the BS together with other system information each frame. If the MSS leaves the current paging zone and enters a new paging zone, the MSS receives a new PZID from the new paging zone BS. The difference between the new PZID and the previously received PZID enables the MSS to recognize an entry into the new paging zone from the previous paging zone. Here, PZID value may be contained in a downlink map(DL-MAP) message, etc.

When an MSS changes paging zones, it requests change of location to the corresponding BS of the new paging zone, so it can respond to a network page in the new location. In preferred embodiments of the present invention, a plurality of cells are grouped to form the paging zone. However, it is not beyond the scope of the present invention to include a single cell in the paging zone. Also, the paging zone, including a single cell, may apply to the inter-cell handover operation. When the concept of the paging zone is the same as that of the single cell as described above, the concept of the paging zone can be applied to handover between cells in the same manner. Further, when the concept of the paging zone is the same as that of the single cell, the MSS can recognize a movement from a previous cell to a new cell by means of a BS ID contained in the DL_MAP message.

The MSS in the idle mode 530 is preferably not assigned the basic resources that should be basically and constantly assigned in the IEEE 802.16e communication system, such as a basic Connection Identifier (CID), a primary management CID, and a secondary management CID, thereby maximizing the efficiency in use of the radio resources.

First, a process of transition of the MSS from the awake mode 510 to the idle mode 530 will be described below.

The mode transition of the MSS from the awake mode 510 to the idle mode 530 is usually forced by the BS or according to a request of the MSS. The MSS in the awake mode 510 mode-transits into the idle mode 530 by transmitting a mobile idle mode transition request (MOB_IDL_REQ) message and receiving a mobile idle mode transition response (MOB_IDL_RSP) message when there is expected to be no data transmission/reception during a predetermined time interval set in advance by the BS or the MSS. The mode transition of the MSS from the awake mode 510 to the idle mode 530 will be described in detail later.

Meanwhile, the mode transition of the MSS from the idle mode 530 to the awake mode 510 as shown by arrow 541 may be performed when the MSS receives a mobile paging request (MOB_PAG_REQ) from the BS, when the MSS has data to transmit, when the MSS moves from the current paging zone, when a location update is performed at expiration of the predetermined time interval, or when the new BS to which the MSS moves does not support the idle mode 530. The mode transition of the MSS from the idle mode 530 to the awake mode 510 will be described later in detail, so its detailed description is omitted here.

The above description with reference to FIG. 5 is given on the operation modes supported by a MAC layer of a broadband wireless access communication system according to an embodiment of the present invention. Hereinafter, an operation of the MSS from the awake mode to the idle mode will be described with reference to FIG. 6.

First, in a state where the MSS 610 is in the awake mode, when there is no data transmission or reception between the MSS and the BS 620, the MSS 610 transmits an MOB_IDL_REQ message to the BS 620 (step 611). The MOB_IDL_REQ message may contain a preferred idle interval (PREF_IDLE_INTERVAL), that is, an idle interval (or paging cycle) during which the MSS 610 stays in the idle mode. Nomenclature such as a paging cycle or preferred paging cycle arises from the fact that the MSS escapes from the idle mode and monitors whether there is a paging from the base station in this cycle. In the following description, the term 'paging cycle' will be mainly used instead of the 'idle interval'.

The MOB_IDL_REQ message has a structure as illustrated in Table 1.

In Table 1, 'Management Message Type' contains information about the type of message being currently transmitted. Currently, the 'Management Message Type' of the MOB_IDL_REQ message is undetermined yet and has thus been marked as '??'. Further, 'PREF_IDLE_INTERVAL_INDEX' represents an idle interval (i.e. paging cycle) preferred by the MSS.

The BS 620, upon receiving the MOB_IDL_REQ message from the MSS 610, transmits an idle mode request (IDLE_MODE_REQUEST) message to a paging controller (PC) 630 in step 613. Upon receiving the IDLE_MODE_REQUEST message from the BS 620, the paging controller 630 determines a paging cycle for the MSS 610 by referring to the preferred paging cycle of the MSS 610 and the MAC address of the MSS 610. Herein, the paging cycle determined by the paging controller 630 will be called 'selected paging cycle'. Further, the paging controller 630 determines a paging time point for paging the MSS 610 in accordance with the selected paging cycle (step 615). The paging controller 630 transmits an idle mode response (IDLE_MODE_RESPONSE) message containing the selected paging cycle and the paging time point to the BS 620 (step 617).

Upon receiving the IDLE_MODE_RESPONSE message, the BS 620 transmits the MOB_IDL_RSP message containing information about the selected paging cycle (step 619). The MOB_IDL_RSP message has a structure as illustrated in Table 2 below.

TABLE 2

| Syntax | Size | Notes |
|---|---|---|
| MOB_IDL-RSP_Message_Format( ) { | | |
| Management message type =?? | 8 bits | |
| Idle approved | 1 bit | 0: Idle Transition Denied |
| | | 1: Idle Transition approved |
| If(Idle approved = = 0){ | | |
| After-REQ-action | 1 bit | 0: The MSS may retransmit the MOB_IDL_REQ after the time duration (REQ-duration) given by the BS in this message |
| | | 1: The MSS shall not retransmit the MOB_IDL-REQ and shall wait the MOB_IDL-RSP form the BS |
| REQ-duration | 4 bits | Time duration for case where After-REQ-action value is 0. |
| reserved | 2 bits | |
| } else{ | | |
| SEL_IDLE_INTERVAL_INDEX | 4 bits | |
| TB_REGI_REQUIRED | 1 bit | Timer-base registration required |
| | | 0: not required |
| | | 1: required |
| If(TB_REGI_REQUIRED !=0) | | |
| TB_REGI_INDEX | 8 bits | 0: reserved |
| | | 1~255 |
| } | | |
| reserved | 2 bits | |
| } | | |

TABLE 1

| Syntax | Size | Notes |
|---|---|---|
| MOB_IDL-REQ_Message_Format( ){ | | |
| Management message type =?? | 8 bits | |
| PREF_IDLE_INTERVAL_INDEX | 4 bits | |
| Reserved | 4 bits | |
| } | | |

In Table 2, 'Management Message Type' contains information about the type of message being currently transmitted. Currently, the 'Management Message Type' of the MOB_IDL_RSP message is undetermined yet and has thus been marked as '??'. Further, 'Idle approved' represents whether the mode transition into the idle mode has been approved. When the 'Idle approved' has a value of '0', it indicates that the mode transition into the idle mode is not approved. When the 'Idle approved' has a value of '1', it indicates that the mode transition into the idle mode is approved. 'After_REQ_action' represents whether the MSS should retransmit the MOB_IDL_REQ message, with a '0' indicating that it should retransmit and a '1', indicating that is should not.

'REQ_duration' represents the time the MSS waits before re-transmitting the MOB_IDL_REQ message. 'SEL_IDLE_INTERVAL_INDEX' represents the selected paging cycle determined by the paging controller 630. 'TB_RE-GI_REQUIRED' indicates whether a timer-based registration is requested with a '0' indicating the registration has not been requested and a '1' indicating that is has. 'TB_REGI_INDES' indicates the count value of-the timer when the timer-based registration is requested.

The MSS 610 mode-transits from the awake mode into the idle mode by referring to the selected paging cycle contained in the MOB_IDL_RSP message from the BS 620 and monitors whether there is a paging message for the MSS 610 itself in each paging cycle (step 621).

Hereinafter, an operation of the paging controller 630 for determining the paging cycle and the paging time point will be described.

First, the paging controller 630 calculates the first paging time point $F_0$ by using a Hash function employing the MAC address of the MSS 610 as an input parameter. The paging controller 630 obtains a set of the paging time points by using the selected paging cycle D. Here, the selected paging cycle D can be expressed by Equation (1) below:

$$D = (2^i \times \delta) < Y \quad (1)$$

In Equation (1), D represents a paging cycle, Y represents a maximum value of frame number, i represents an exponent of the paging cycle, $\delta$ is equal to $2^j$, and j typically has a value of 0. Of course, j may have another value instead of 0.

When the set of paging time points is put as $\{F_i\}$ (i=0, 1, ..., Y/D), the relation between the $(n+1)^{th}$ paging time point $F_{n+1}$ and the $n^{th}$ paging time point $F_n$ can be expressed by Equation (2) below:

$$F_{n+1} = (F_n + D) \bmod Y \quad (2)$$

As shown in Equation (2), the $(n+1)^{th}$ paging time point $F_{n+1}$ is set differently from the $n^{th}$ paging time point $F_n$ as much as an offset generated in consideration of the $n^{th}$ paging time point $F_n$ and the paging cycle. Herein, an interval between $F_n$ and $F_{n+1}$ is a paging cycle.

The information about the paging cycle and the paging time point determined by the paging controller 630 is shared by all BSs in the paging zone to which the MSS 610 belongs.

Figure 6:
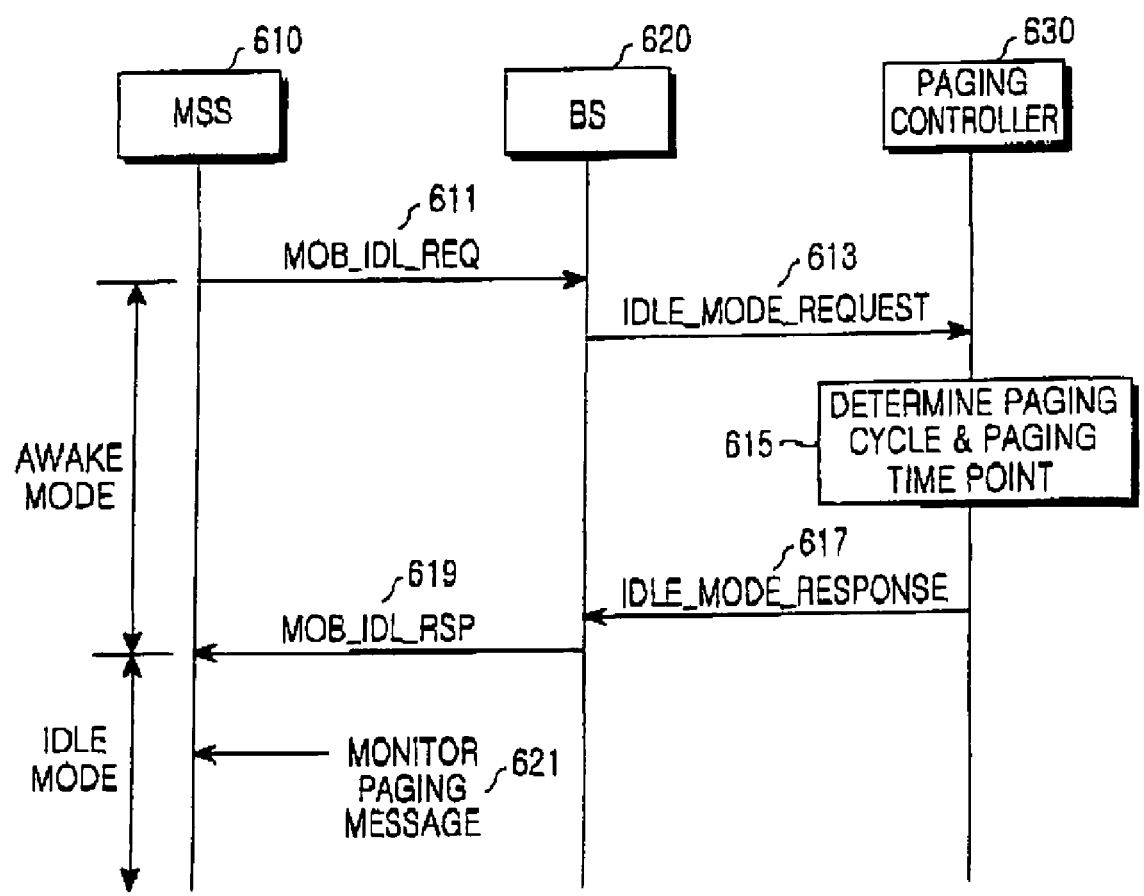
FIG. 6 is a diagram schematically illustrating mode transition of an MSS from the awake mode to the idle mode according to an embodiment of the present invention.

The above description with reference to FIG. 6 is given of the operation of the MSS from the awake mode to the idle mode according to an embodiment of the present invention.

Now, an operation of paging an MSS in the idle mode will be described with reference to FIG. 7.

Figure 7:
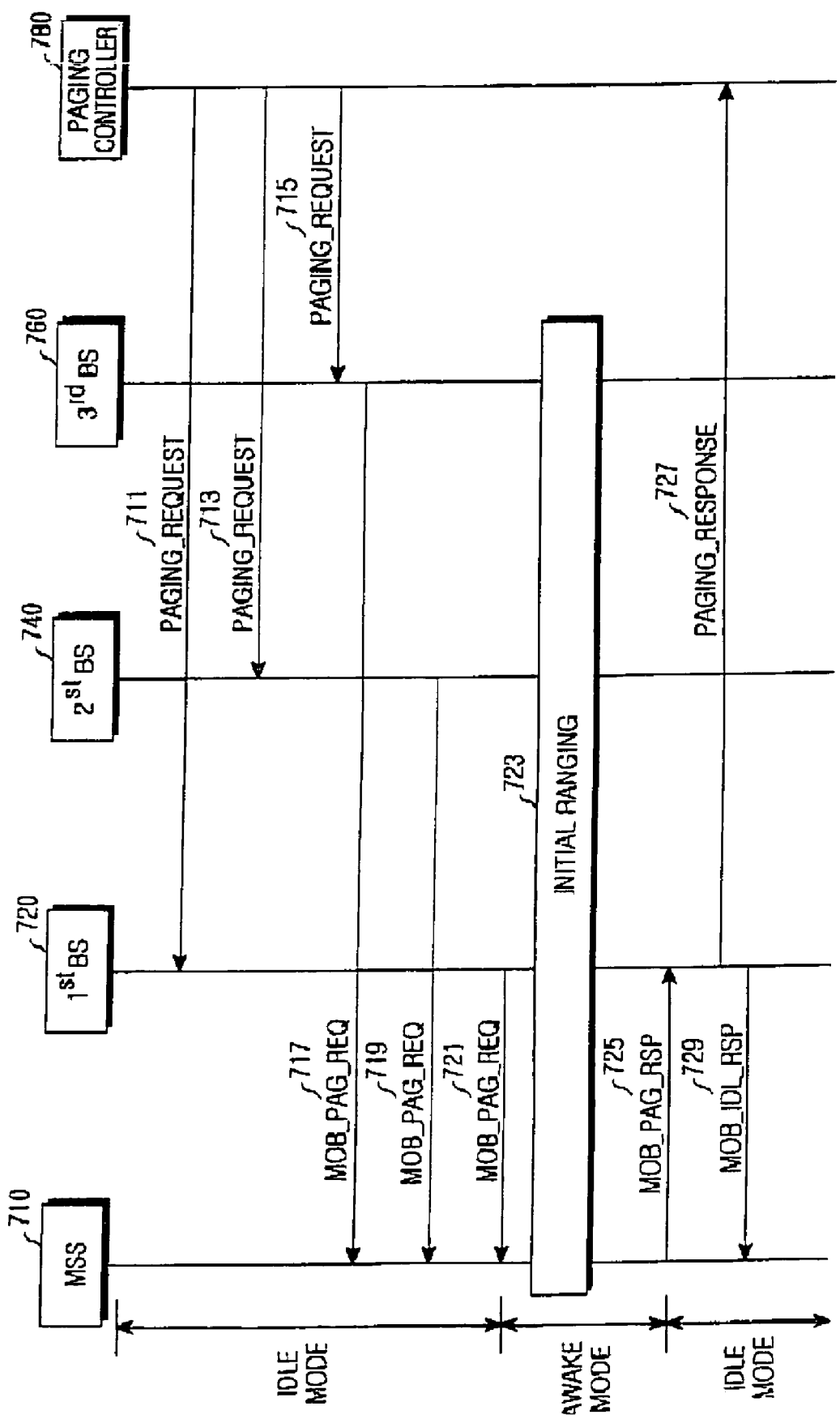
FIG. 7 is a signal flow diagram of a process for paging an MSS in the idle mode according to an embodiment of the present invention.

FIG. 7 is a signal flow diagram of a process for paging an MSS in the idle mode according to an embodiment of the present invention.

First, when the paging controller 780 detects a page or traffic for the MSS 710, the paging controller 780 transmits a PAGING_REQUEST message to all BSs in the paging zone to which the MSS 710 currently belongs (steps 711, 713, and 715). In FIG. 7, the paging zone to which the MSS 710 currently belongs includes three BSs, a first BS 720, a second BS 740, and a third BS 760. The PAGING_REQUEST message is sent to all BSs in the same paging zone because each BS lacks sufficient information to determine which paging zone it is in. Each of the first BS 720, the second BS 740, and the third BS 760 receives the PAGING_REQUEST message from the paging controller 780 and transmits a MOB_PAG REQ message targeting the MSS 710 to the MSS 710 (steps 717, 719, and 721).

The MOB_PAG_REQ message has a structure as shown in Table 3 below.

TABLE 3

| Syntax | Size | Notes |
|---|---|---|
| MOB_PAG-REQ_Message_Format( ){ | | |
| Management message type=?? | 8 bits | |
| Number of paged terminals | 8 bits | |
| For j=0; j<Numer of paged terminals; j++) { | | |
| MAC_ADDRESS | 48 bits | 48bit MSS unique MAC address |
| PAG_PURPOSE | 8 bits | |
| LENGTH | 8 bits | The length of the payload units of bytes |
| PAYLOAD | 8 × LENGTH bits | Paging information |
| } | | |
| } | | |

In Table 3, 'Management Message Type' contains information about the type of message being currently transmitted. Currently, the 'Management Message Type' of the MOB_IDL_RSP message is undetermined yet and has thus been marked as '??'. 'Number of paged terminal' represents the number of MSSs which the network has currently paged from among the MSSs in the idle mode. 'MAC_ADDRESS' represents a MAC address (i.e. a specific identifier) of each paged MSS. Here, the paging message may be obtained by either modifying the existing message currently used in the IEEE 802.16e communication system or 10 generating a new message. Further, 'PAG_PURPOSE' represents the object to transmit the MOB_IDL_REQ message, 'LENGTH' represents the length of 'PAYLOAD', and 'PAYLOAD' represents actual contents corresponding to values marked in 'PAG_PURPOSE'.

The values marked in 'PAG_PURPOSE' are as shown in Table 4 below.

TABLE 4

| Value | description |
|---|---|
| 00000000 | reserved |
| 00000001 | Performing the network re-entry and initialization. |
| 00000010 | No ack. required.(no MOB PAG-RSP) |
| 00000011 | Ack. Required. (no MOB_PAG-RSP) |
| 00000100 | Change idle interval |

TABLE 4-continued

| Value | description |
|---|---|
| 00000101 | Requesting the location update |
| 00000110~0xff | reserved |

In table 4, '00000000' is a value reserved for future use, '00000001' indicates that the MSS receiving the MOB_PAG_REQ performs the network re-entry and intialization, '00000010' indicates that the MSS receiving the MOB_PAG_REQ need not transmit a MOB_PAG_RSP message in response to the MOB_PAG_REQ, '00000011' indicates that the. MSS receiving the MOB_PAG_REQ should transmit a MOB_PAG_RSP message in response to the MOB_PAG_REQ, '00000100' indicates that it is necessary to change the paging cycle, '00000100' indicates that location update should be performed, and '00000110' through '0xff' are values reserved for future use.

The contents of Tables 5 through 9 are recorded in 'PAYLOAD' in accordance with the values marked in 'PAG_ PURPOSE'.

TABLE 5

| Syntax | size | Notes |
|---|---|---|
| PAG_PURPOSE_1_Format( ) {<br>reason | 8 bits | Value<br>0: DL User data buffered<br>1~0xff: reserved |

The contents in Table 5 indicate contents recorded in 'PAYLOAD' when '00000001' is marked on 'PAG_PURPOSE'. When '00000001' is marked on 'PAG_PURPOSE', it indicates that the message is an MOB_PAG_REQ message containing downlink data targeting the MSS.

TABLE 6

| Syntax | Size | Notes |
|---|---|---|
| PAG_PURPOSE_2_Format( ){<br>message | Variable | Message of SMS, MMS, etc. without Ack-required |

The contents in Table 6 indicate contents recorded in 'PAYLOAD' when '00000010' is marked on 'PAG_PURPOSE'. When '00000010' is marked on 'PAG_PURPOSE', it indicates that the message is an MOB_PAG_REQ message which does not require transmission of an MOB_PAG_RSP message in response to the MOB_PAG_REQ message.

TABLE 7

| Syntax | Size | Notes |
|---|---|---|
| PAG_PURPOSE_3_Format( ){<br>message | Variable | Message of SMS, MMS, etc. with Ack-required |

The contents in Table 7 indicate contents recorded in 'PAYLOAD' when '00000011' is marked on 'PAG_PURPOSE'. When '00000011' is marked on 'PAG_PURPOSE', it indicates that the message is an MOB_PAG_REQ message which requires transmission of an MOB_PAG_RSP message in response to the MOB_PAG_REQ message.

TABLE 8

| Syntax | Size | Notes |
|---|---|---|
| PAG_PURPOSE_4_Format( ) {<br>idle interval index<br>reserved | 4 bits<br>4 bits | |

The contents in Table 8 indicate contents recorded in 'PAYLOAD' when '00000100' is marked on 'PAG_PURPOSE'. When '00000100' is marked on 'PAG_PURPOSE', it indicates that the message is an MOB_PAG_REQ message which requires to change the paging cycle.

TABLE 9

| Syntax | Size | Notes |
|---|---|---|
| PAG_PURPOSE_5_Format( ){<br>reserved | 8 bits | |

The contents in Table 9 indicate contents recorded in 'PAYLOAD' when '00000101' is marked on 'PAG_PURPOSE'. When '00000101' is marked on 'PAG_PURPOSE', it indicates that the message is an MOB_PAG_REQ message which requires location update.

The example of FIG. 7 assumes that 'PAG_PURPOSE' of the MOB_PAG_REQ message is marked as '00000011', which indicates transmission of an MOB_PAG_RSP message in response to the MOB_PAG_REQ message. Table 10 shows the structure of the MOB_PAG_REQ message.

TABLE 10

| Syntax | Size | Notes |
|---|---|---|
| MOB_PAG-RSP_Message_Format( ) {<br>   Management message type =?? | 8 bits | |
|    Cause | 2 bits | 00 & 11: reserved<br>01: MOB_PAG_REQ accepted<br>10: MOB_PAG_REQ rejected |
|    PL_TYPE | 6 bits | 0: Just Acknowledge<br>1: Response Message of the SMS, MMS, etc.<br>2-63: reserved |
|    LENGTH | 8 bits | If, PL_TYPE == 0, this field is set to 0 also. |
|    PAYLOAD<br>} | 8 × LENGTH bits | |

In Table 10, 'Management Message Type' contains information about the type of message being currently transmitted. Currently, the 'Management Message Type' of the MOB_IDL_RSP message is undetermined yet and has thus been marked as '??'. 'Cause' indicates the reason for the transmission of the MOB-PAG_RSP message. When '01' is marked on 'Cause', it indicates that the MOB_PAG_REQ message has been approved. A '10' indicates that the MOB_PAG_REQ message has been denied. Further, 'PL_TYPE' represents the type of 'PAYLOAD' of the MOB_PAG_RSP message; '01' indicates just an acknowledgement, '10' indicates a response message. 'LENGTH' represents the length of 'PAYLOAD'.

Upon receiving the MOB_PAG_REQ message, the MSS 710 recognizes from the value '00000011' marked on 'PAG_PURPOSE' that the MSS 710 transmits a MOB_PAG_RSP message to a corresponding BS in response to the MOB_PAG_REQ message. Herein, if the MSS 710 has moved within the paging zone to another BS different from the BS to which the MSS 710 belonged before the mode transition into the idle mode, the MSS 710 performs the initial ranging again(step 723). The MSS 710 performs the initial ranging because the MSS 710 needs assigned uplink bandwidth, etc. in order to transmit the MOB_PAG_RSP message. FIG. 7 assumes that the MSS 710 determined from the initial ranging that the first BS 720 is the serving BS to which the MSS 710 currently belongs.

Thereafter, the MSS 710 transmits the MOB_PAG_RSP message to the first BS 720 (step 725). Upon receiving the MOB_PAG_RSP message, the first BS 720 transmits to the paging controller 780 a 'PAGING_RESPONSE' message responding to the 'PAGING_REQUEST' message (step 727). Further, the first BS 720 transmits an MOB_IDL_RSP message to the MSS 710, thereby controlling the MSS 710 to transit into the idle mode (step 729).

The above description with reference to FIG. 7 is given of an operation of paging an MSS in the idle mode according to an embodiment of the present invention. Now, handover of an MSS in the idle mode which does not require location update according to an embodiment of the present invention will be described with reference to FIG. 8.

Figure 8:
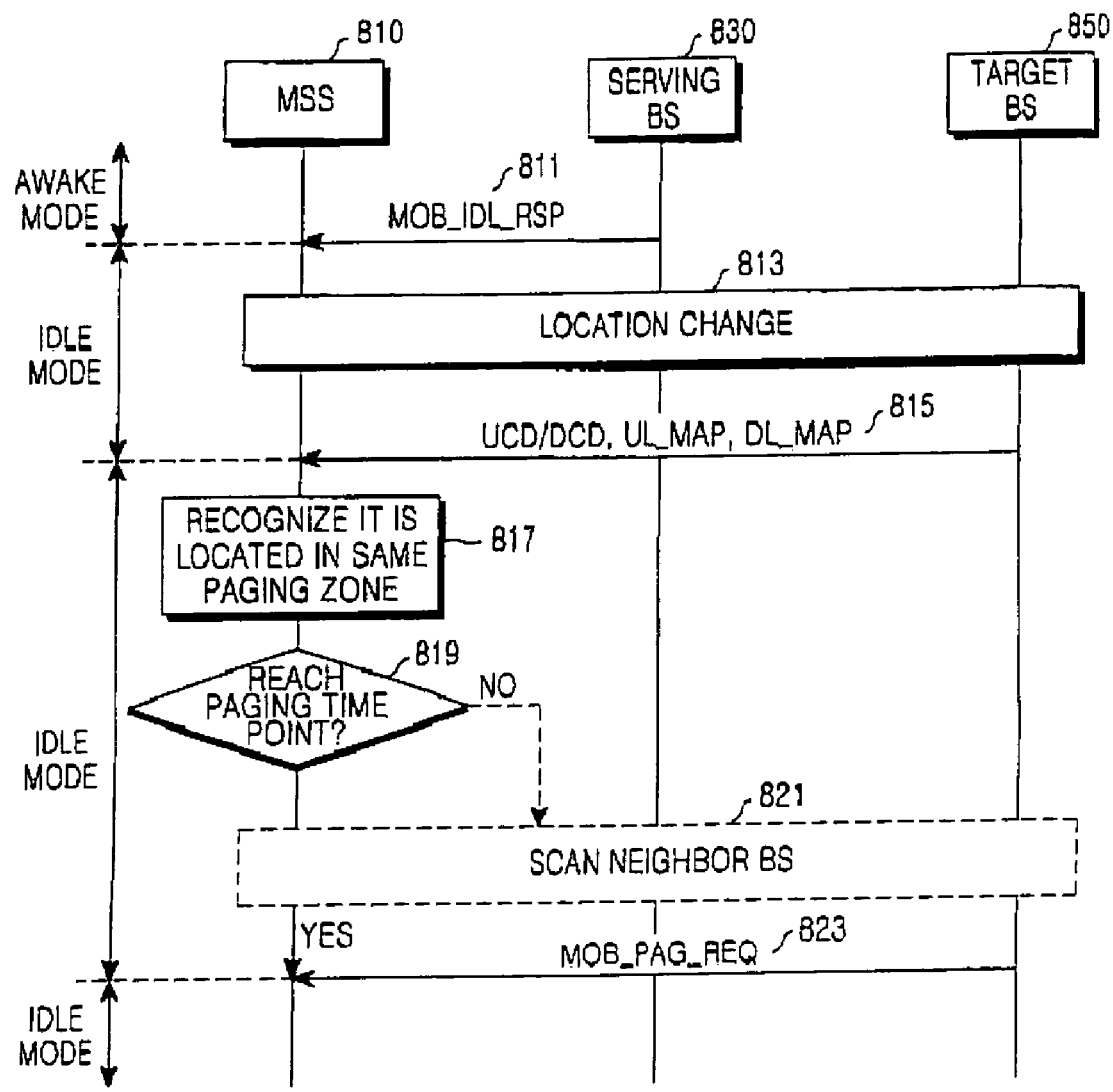
FIG. 8 is a signal flow diagram of a process for handover of an MSS in the idle mode which does not require a location update according to an embodiment of the present invention.

FIG. 8 is a signal flow diagram of a process for handover of an MSS in the idle mode which does not require location update according to an embodiment of the present invention.

FIG. 8 is based on the case where handover of an MSS 810 in the idle mode moves (i.e. performs the handover) within the same paging zone (i.e. in a paging zone using the same PZID). Referring to FIG. 8, a serving BS 830 transmits an MOB_IDL_RSP message to the MSS 810 (step 811). The serving BS830 may transmit the MOB_IDL_RSP message either in response to the MOB_IDL_REQ message, or based on an unsolicited scheme. Here, the transmission of the MOB_IDL_RSP message by the serving BS 830 is based on an unsolicited scheme and may be intended to adjust the load of the serving BS 830. Upon receiving the MOB_IDL_RSP message from the serving BS 830, the MSS 810 transits from the awake mode to the idle mode.

While the MSS 810 is in the idle mode, it moves from a service zone controlled by the serving BS 830 to another service zone controlled by a target BS 850 (step 813). For this example, it is assumed that the serving BS 830 and the target BS 850 are located within the same paging zone.

When the MSS 810 moves, communication between the serving BS 830 and the MSS 810 is disconnected and the MSS 810 cannot receive the MOB_PAG_REQ message even though the MSS 810 performs network monitoring after awakening at the paging time point. Therefore, when the MSS 810 moves to a new BS (i.e. target BS 850), the MSS receives information of the target BS 850 from an uplink channel descriptor (UCD) message, a downlink channel descriptor (DCD) message, and DL_MAP and UL_MAP messages broadcast by the target BS 850 (step 815). As described above, the PZID of the target BS 850 may be contained in the DL_MAP message.

By receiving BS information broadcast by the target BS 850, the MSS 810 detects the PZID of the target BS 850, and thus recognizes that the serving BS 830 and the target BS 850 are located within the same paging zone (step 817). Then, the MSS 810 checks the frame number, thereby recognizing its own paging time point. Thereafter, the MSS 810 checks whether it has reached the paging time point (step 819). If it has not yet reached the paging time point, the MSS 810 scans neighbor BSs (step 821). Here, scanning of the neighbor BSs includes scanning of Carrier to Interference and Noise Ratio (CINRs) of pilot signals transmitted from the neighbor BSs to detect movement of the MSS in the idle mode.

When it has reached the paging time point, the MSS awakes from the idle mode and receives the MOB_PAG_REQ message from the target BS 850 step 823). Here, it is assumed that the MOB_PAG_REQ message transmitted from the target BS 850 does not contain the MAC address of the MSS 810, so hat the MSS 810 remains in the idle mode.

The above description with reference to FIG. 8 is given of handover of an MSS in the idle mode that does not require location update according to an embodiment of the present invention. Now, handover of an MSS in the idle mode that does use location updates according to an embodiment of the present invention will be described with reference to FIG. 9.

Figure 9:
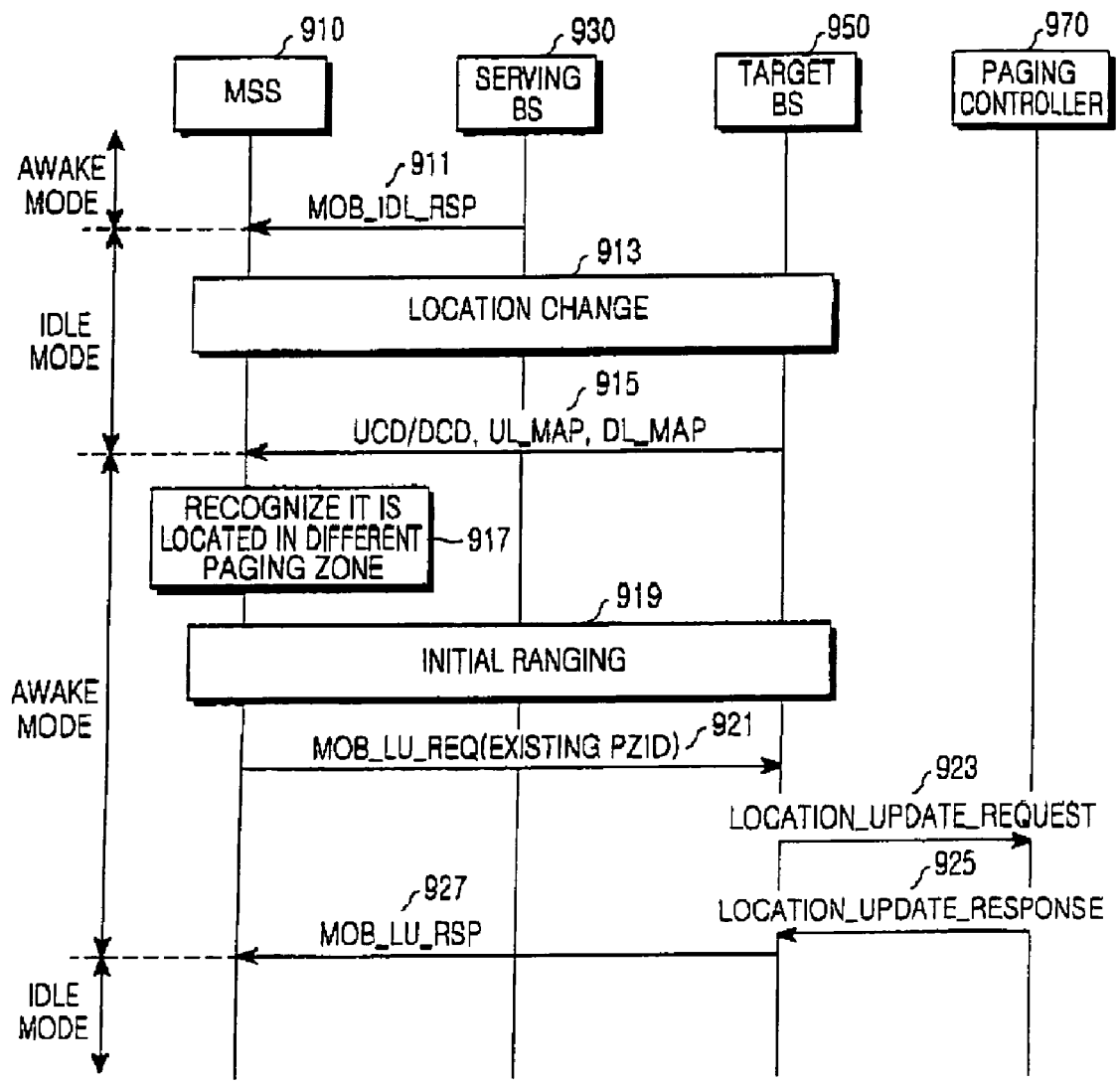
FIG. 9 is a signal flow diagram of a process for handover of an MSS in the idle mode which requires a location update according to an embodiment of the present invention.

FIG. 9 is a signal flow diagram of a process for handover of an MSS in the idle mode that uses location updates according to an embodiment of the present invention.

FIG. 9 is based on a case where handover of an MSS 910 in the idle mode moves (i.e. performs the handover) into a different paging zone (i.e. into a paging zone using a different PZID). Referring to FIG. 9, a serving BS 930 transmits a MOB_IDL_RSP message to the MSS 910 (step 911). The serving BS 930 may be transmitting the MOB_IDL_RSP message either in response to an MOB_IDL_REQ message transmitted from the MSS 910, or based on an unsolicited scheme. Here, the MOB_IDL_RSP message is transmitted based on the unsolicited scheme and may be intended to adjust the load of the serving BS 930. Upon receiving the MOB_IDL_RSP message from the serving BS 930, the MSS 910 transits from the awake mode to the idle mode.

In this example, while the MSS 910 is idle, the MSS 910 moves from a service zone controlled by the serving BS 930 to another service zone controlled by a target BS 950(step 913). Here, it is assumed that the serving BS 930 and the target BS 950 are located within different paging zones. When the MSS 910 moves, the communication between the serving BS 930 and the MSS 910 is disconnected so the MSS 910 cannot receive the MOB_PAG_REQ message, even though the MSS 910 performs network monitoring after awakening at the paging time point. Therefore, when the MSS 910 moves to a new BS (i.e. target BS 950), the MSS receives information of the target BS 950 from an UCD message, a DCD message, and DL_MAP and UL_MAP messages broadcasted by the target BS 950 (step 915). As described above, the PZID of the target BS 950 may be contained in the DL_MAP message.

By receiving the BS information broadcast by the target BS 950, the MSS 910 detects the PZID of the target BS 950 and thus recognizes that the serving BS 930 and the target BS 950 are located within different paging zones (step 917). Then, the MSS 910 performs the initial ranging (step 919) to acquire the basic CID and the primary management CID. Then, the MSS 910 transmits a mobile location update request (MOB_LU_REQ) message to the target BS 950 (step 921). The MOB_LU_REQ message has a structure as shown in Table 11.

TABLE 11

| Syntax | Size | Notes |
|---|---|---|
| MOB_LU-REQ_Message_Format( ) { | | |
| Management message type =?? | 8 bits | |
| PREF_IDLE_INTERVAL_INDEX | 4 bits | |
| PREV_PZONE_ID | | |
| } | | |

In Table 11, 'Management Message Type' contains information about the type of message being currently transmitted. Currently, the 'Management Message Type' of the MOB_LU_REQ message is undetermined yet and has thus been marked as '??'. Further, 'PREF_IDLE_INTERVAL_INDEX' represents an idle interval (i.e. paging cycle) preferred by the MSS, and 'PREF_PZONE_ID' represents a PZID of the serving BS 930 to which the MSS 910 belonged before the handover.

Upon receiving the MOB_LU_REQ message from the MSS 910, the target BS 950 transmits a location update request (LOCATION_UPDATE_REQUEST) message to the paging controller 970 (step 923). Here, the LOCATION_UPDATE_REQUEST message transmitted from the target BS 950 contains a MAC address of the MSS 910 requiring the location update and the PZID of the serving BS 930 to which the MSS 910 belonged before the handover. Upon receiving the LOCATION_UPDATE_REQUEST message, the paging controller 970 updates the location of the MSS 910 based on the PZID and the MAC address contained in the LOCATION_UPDATE_REQUEST message and then transmits a location update response (LOCATION_UPDATE_RESPONSE) message to the target BS 950 in response to the LOCATION_UPDATE_REQUEST message (step 925). Upon receiving the LOCATION_UPDATE_RESPONSE message from the paging controller 970, the target BS 950 transmits a mobile location update response (MOB_LU_RSP) message to the MSS 910 (step 927). The MOB_LU_RSP message has a structure as shown in Table 12 below.

TABLE 12

| Syntax | Size | Notes |
|---|---|---|
| MOB_LU-RSP_Message_Format( ) { | | |
| Management message type =?? | 8 bits | |
| LU approved | 1 bit | 0: Location update failed<br>1: Location update succeed |
| If(LU approved = = 0) { | | |
| After-REQ-action | 1 bit | 0: The MSS may retransmit the MOB_LU_REQ after the time duration (REQ-duration) given by the BS in this message.<br>1: The MSS shall not retransmit the MOB_LU_REQ and shall wait the MOB_LU_RSP from the BS. |
| REQ-duration | 4 bits | Time duration for case where After-REQ-action value is 0 |
| reserved | 2 bits | |
| } else { | | |
| SEL_IDLE_INTERVAL_INDEX | 4 bits | |
| TB_REGI_REQUIRED | 1 bit | Timer-base registration required<br>0: not required<br>1: required |
| If (TB_REGI_REQUIRED ! = 0) | | |
| TB_REGI_INDEX | 8 bits | 0: reserved<br>1~255 |
| } | | |
| reserved | 2 bits | |
| } | | |

In Table 12, 'Management Message Type' contains information about the type of message being currently transmitted. Currently, the 'Management Message Type' of the MOB_LU_RSP message is undetermined yet and has thus been marked as '??'. Further, 'LU approved' indicates whether the location update has failed; a value of '0' indicates failure and a value of '1' indicates success. 'After_REQ_action' indicates whether the MSS should retransmit the MOB_LU_REQ message when the location update has failed with a '0' indicating retransmission after waiting a predetermined time, and a '1' indicating retransmission is not needed. 'REQ_duration' indicates a duration during which the MSS waits to retransmit the MOB_LU_REQ message. 'SEL_IDLE_INTERVAL_INDEX' indicates a paging cycle newly determined when the location update has been achieved. 'TB_REGI_REQUIRED' indicates whether the new BS (the target BS) requests a timer-based registration. 'TB_REGI_INDES' indicates a count value of the timer when the target BS requests timer-based registration.

Upon receiving the MOB_LU_RSP message from the target BS 950, the MSS 910 switches, or mode-transits into the idle mode correspondingly to the selected paging cycle, etc. contained in the MOB_LU_RSP message.

The above description with reference to FIG. 9 is given of handover of an MSS in the idle mode that uses location updates according to an embodiment of the present invention. Now, periodic location update of an MSS in idle mode according to an embodiment of the present invention will be described with reference to FIG. 10.

Figure 10:
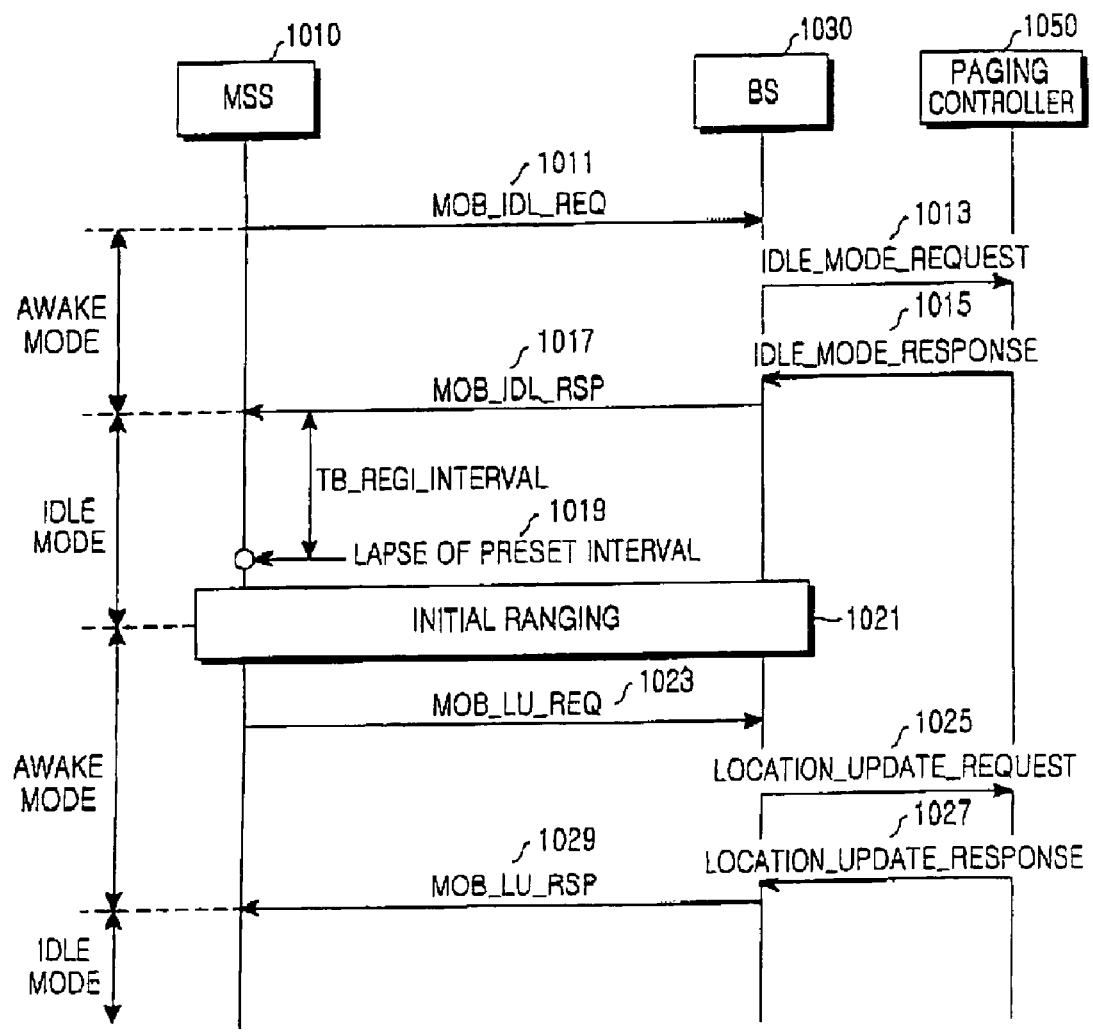
FIG. 10 is a signal flow diagram of a process for periodic location update of an MSS in the idle mode according to an embodiment of the present invention.

FIG. 10 is a signal flow diagram of a process for periodic location update of an MSS in the idle mode according to an embodiment of the present invention.

First, an MSS 1010 in the awake mode transmits an MOB_IDL_REQ message to the BS 1030 (step 1011). Upon receiving the MOB_IDL_REQ message from the MSS 1010, the BS 1030 transmits an IDLE_MODE_REQUEST message to the paging controller 1050 (step 1013). Upon receiving the IDLE_MODE_REQUEST message from the BS 1030, the paging controller 1050 transmits to the BS 1030 an IDLE_MODE_RESPONSE message responding to the IDLE_MODE_REQUEST message (step 1015). Upon receiving the IDLE_MODE_RESPONSE message, the BS 1030 transmits to the MSS 1010, an MOB_IDL_RSP message in response to the MOB_IDL_REQ message (step 1017). Here, the MOB_IDL_RSP message contains a selected paging cycle and a paging time point determined for the MSS 1010, and a request for registration based on the timer. That is, it is assumed that the 'TB_REGI_RE-QUIRED' of the MOB_IDL_REQ message is marked as 1.

Upon receiving the MOB_IDL_RSP message from the BS 1030, the MSS 1010 switches, or transits, from the awake mode into the idle mode. The MSS 1010 starts count of a predetermined time interval, 'TB_REGI_INTERVAL', to request the timer-based registration in idle mode and performs the initial ranging (step 1021) for the location update when it has reached the 'TB_REGI_INTERVAL' (step 1019). By performing the initial ranging, the MSS 1010 acquires the basic CID and the primary management CID. Then, the MSS 1010 transmits an MOB_LU_REQ message to the BS 1030 (step 1023). Steps 1023 through 1029 in FIG. 10 are similar to steps 921 through 927 in FIG. 9 between the MSS 910, the target BS 950, and the paging controller 970, so a detailed description of them will not be repeated here.

Next, the process of determining the 'TB_REGI_INTER-VAL' by the MSS 910 is described.

First, the MSS 910 obtains the 'TB_REGI_INTERVAL' by using the 'TB_REGI_INDEX' and 'SEL_IDLE_INTER-VAL_INDEX' in the MOB_HDL_RSP message. Here, the 'TB REGI_INTERVAL' can be expressed by Equation (3) below.

$$TB\_REGI\_INTERVAL = 2^i T \quad (3)$$

In Equation (3), i represents 'SEL_IDLE_INTERVAL_INDEX' and T represents 'TB_REGI_INDEX'. That is, 'TB_REGI_INTERVAL' can be expressed as an integer number multiple of the paging cycle.

Location updates of the MSS are periodically performed to increase convenience in the location update and reliability in the updated location of the MSS. Of course, as described above with reference to FIG. 10, the location update may be performed even when a zone in which the MSS is located is not actually changed. However, when the paging controller performs the paging while enlarging the paging zone from the cell which has been most-recently updated by the MSS, the increase of the load due to the periodic location update can be compensated for by the reduction of the load by the reduction of the paging zone.

As described above, the present invention provides new MAC layer operation modes proper for a broadband wireless access communication system, thereby minimizing power consumption while supporting mobility of an MSS and high speed data transmission. Further, the present invention prevents unnecessary possession of radio resources by discarding the network entry process in the same paging zone. Therefore, the present invention can maximize efficiency in use of resources and eliminates message overhead due to network entry.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A broadband wireless access communication system in which paging time points are determined, comprising:
   a plurality of mobile subscriber stations; and
   a means for determining paging time points for the plurality of mobile subscriber stations, determining an offset value in order to differently set the paging time points at which the plurality of mobile subscriber stations awaken, determining based on a paging cycle and the offset value the paging time points, and transmitting to the plurality of mobile subscriber stations at least one message indicating the determined paging time points,
   wherein at least one of the plurality of mobile subscriber stations is adapted to mode-transition from an idle mode into an awake mode when the mobile subscriber station detects a paging targeting the mobile subscriber station itself, is further adapted to be served by a serving base station, mode-transition into an awake mode and perform location update with a target base station based on a detected movement of the mobile subscriber station into a paging zone different from a paging zone of the serving base station, and transmits a location update request to the target base station and receives a location update response from the target base station, and further
   wherein the paging zone is a zone grouping a plurality of base stations, and the base stations in a same paging zone use a same paging zone identifier.

2. The communication system of claim 1, wherein at least one of the plurality of mobile subscriber stations is adapted to receive paging information broadcasted from a serving base station of the mobile subscriber station in accordance with the paging cycle and recognize existence of the paging when the paging information contains a mobile subscriber station identifier of the mobile subscriber station.

3. The communication system of claim 2, wherein the mobile subscriber station identifier is a medium access control layer address of the mobile subscriber station.

4. A method for controlling, by a communication system, operation modes of a plurality of mobile subscriber stations, the method comprising the steps of:
   determining a paging cycle;
   determining an offset value in order to differently set paging time points at which the plurality of mobile subscriber stations awaken;
   determining based on the paging cycle and the offset value the paging time points; and
   mode-transitioning by a mobile subscriber station from an idle mode into an awake mode when the mobile subscriber station detects a paging targeting the mobile subscriber station itself, and performing location update with a target base station based on a detected movement of the mobile subscriber station into a paging zone different from a paging zone of the serving base station, wherein the mode transitioning and performing location update further include transmitting a location update request to the target base station and receiving a location update response from the target base station.

5. The method as claimed in claim 4, wherein the step of detecting the paging comprises:
   receiving paging information broadcasted from a serving base station of the mobile subscriber station in accordance with the paging cycle; and
   recognizing existence of the paging when the paging information contains a mobile subscriber station identifier of the mobile subscriber station.

6. The method as claimed in claim 4, wherein the mobile subscriber station identifier is a medium access control layer address of the mobile subscriber station.

7. The method as claimed in claim 4, wherein the paging zone is a zone grouping a plurality of base stations, and the base stations in a same paging zone use a same paging zone identifier.

* * * * *